(12) United States Patent
Xie et al.

(10) Patent No.: US 10,764,085 B2
(45) Date of Patent: Sep. 1, 2020

(54) LOOP FAILURE HANDLING METHOD AND SWITCH

(71) Applicant: Huawei Technologies Co., Ltd., Shenzhen (CN)

(72) Inventors: Ying Xie, Nanjing (CN); Shaoqi Zhao, Nanjing (CN); Pu Cheng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/432,397

(22) Filed: Jun. 5, 2019

(65) Prior Publication Data

US 2019/0288871 A1 Sep. 19, 2019

Related U.S. Application Data

(63) Continuation of application No. PCT/CN2017/107704, filed on Oct. 25, 2017.

(30) Foreign Application Priority Data

Dec. 6, 2016 (CN) .......................... 2016 1 1110936

(51) Int. Cl.
*H04L 12/437* (2006.01)
*H04L 12/46* (2006.01)
(Continued)

(52) U.S. Cl.
CPC ............ *H04L 12/437* (2013.01); *H04L 12/42* (2013.01); *H04L 12/4641* (2013.01);
(Continued)

(58) Field of Classification Search
CPC ............... H04L 12/437; H04L 41/0677; H04L 41/0672; H04L 12/42; H04L 12/4641;
(Continued)

(56) References Cited

U.S. PATENT DOCUMENTS 7,515,530 B2 4/2009 Jain et al.
2004/0218539 A1 11/2004 Anqud et al.
(Continued)

FOREIGN PATENT DOCUMENTS

CN 101405976 A 4/2009
CN 101640622 A 2/2010
(Continued)

OTHER PUBLICATIONS

Foreign Communication From a Counterpart Application, European Application No. 17878717.2, Extended European Search Report dated Oct. 11, 2019, 8 pages.
(Continued)

*Primary Examiner* — Tejis Daya
(74) *Attorney, Agent, or Firm* — Conley Rose, P.C.

(57) ABSTRACT

A switch receives a first packet, where the first packet includes a source media access control MAC address. The switch obtains a first flapping count corresponding to the source MAC address. The switch determines, based on the first flapping count, whether a loop failure occurs in a network in which the switch is located. When the loop failure occurs in the network in which the switch is located, the switch obtains a flapping port set corresponding to the source MAC address. The switch determines a primary port in the plurality of ports, where the primary port is a port that must be suppressed. The switch enables a flooding suppression function on the primary port, where the flooding suppression function is used to suppress forwarding of a received flooding packet by the primary port.

20 Claims, 6 Drawing Sheets

(51) Int. Cl.
*H04L 12/24* (2006.01)
*H04L 29/12* (2006.01)
*H04L 12/42* (2006.01)

(52) U.S. Cl.
CPC ...... *H04L 41/0654* (2013.01); *H04L 41/0672* (2013.01); *H04L 41/0677* (2013.01); *H04L 61/6022* (2013.01)

(58) Field of Classification Search
CPC ............ H04L 41/0654; H04L 61/6022; H04L 2012/4629
See application file for complete search history.

(56) References Cited

U.S. PATENT DOCUMENTS

| | | |
|---|---|---|
| 2006/0126517 A1 | 6/2006 | Kurosaki et al. |
| 2007/0118595 A1* | 5/2007 | Jain ........................ H04L 12/462 709/203 |
| 2008/0123561 A1* | 5/2008 | Sharma ................... H04L 45/00 370/256 |
| 2012/0163166 A1 | 6/2012 | Peng et al. |
| 2013/0114400 A1 | 5/2013 | Zhang et al. |
| 2013/0232259 A1* | 9/2013 | Csaszar ............... H04L 43/0817 709/224 |
| 2014/0254604 A1* | 9/2014 | Janardhanan ........... H04L 45/12 370/401 |
| 2017/0230265 A1* | 8/2017 | Mishra ................ H04L 41/0816 |

FOREIGN PATENT DOCUMENTS

| | | |
|---|---|---|
| CN | 102347865 A | 2/2012 |
| CN | 105933180 A | 9/2016 |
| EP | 2590372 A1 | 5/2013 |

OTHER PUBLICATIONS

Machine Translation and Abstract of Chinese Publication No. CN101405976, Apr. 8, 2009, 30 pages.
Machine Translation and Abstract of Chinese Publication No. CN105933180, Sep. 7, 2016, 23 pages.
Hao, J. T., et al., "Architecture of MPLS/IP Network with Hardened Pipes," draft-hao-mpls-ip-hard-pipe-00.txt, Jul. 1, 2014, 14 pages.
Hao, J. T., et al., "Architecture of an IP/MPLS Network with Hardened Pipes," Independent Submission, RFC 7625, Aug. 2015, 15 pages.
Foreign Communication From a Counterpart Application, PCT Application No. PCT/CN2017/107704, English Translation of International Search Report dated Nov. 29, 2017, 2 pages.
Foreign Communication From a Counterpart Application, PCT Application No. PCT/CN2017/107704, English Translation of Written Opinion dated Nov. 29, 2017, 5 pages.

* cited by examiner

| MAC address | Flapping port set | Flapping start time | Last update time of the MAC entry | Flapping count |
|---|---|---|---|---|
| MAC 1 | 111, 112 | T0 | T1 | 3 |
| ... | ... | ... | ... | ... |

FIG. 6

| MAC address | Flapping port set | Flapping start time | Last update time of the MAC entry | Flapping count | Suppression flag |
|---|---|---|---|---|---|
| MAC 1 | 111, 112 | T1 | T2 | 30 | 1 |
| ... | ... | ... | ... | ... | ... |

FIG. 7

LOOP FAILURE HANDLING METHOD AND SWITCH

CROSS-REFERENCE TO RELATED APPLICATIONS

This application is a continuation application of International Application No. PCT/CN2017/107704, filed on Oct. 25, 2017, which claims priority to Chinese Patent Application No. 201611110936.5, filed on Dec. 6, 2016. The disclosures of the aforementioned applications are hereby incorporated by reference in their entireties.

TECHNICAL FIELD

The present disclosure relates to network communications technologies, and in particular, to a loop failure handling method and a switch.

BACKGROUND

An incorrect network wiring in an Ethernet or an incorrect configuration of a switch may cause the Ethernet to form a loop. When a packet is forwarded in the loop, a broadcast storm is formed, and this severely affects services of the whole network. In view of the broadcast storm caused by the Ethernet loop, a network administrator expects that an Ethernet switch can automatically and precisely locate a port related to a loop failure, and block the related port when the loop failure occurs in the Ethernet, to avoid adverse impact on the whole network.

To minimize a risk caused by the loop failure, usually, a ring protection protocol, such as the Spanning Tree Protocol (STP) or the Ethernet Ring Protection Switching (ERPS), is deployed in the Ethernet ring network. The ring protection protocols support computation of a logical loop-free network on a physical ring (ring) network. However, the ring protection protocol such as STP or ERPS can ensure, only when configurations are correct, that the network does not form a loop logically. When incorrect wiring or an incorrect configuration exists in the network, or a loop is formed in a user network accessed to the Ethernet ring network, or the like, the ring protection protocol such as STP or ERPS cannot resolve a loop failure. Similarly, in a large layer 2 network of a data center, a plurality of access switches access a same aggregation (or core) switch, so that all the access switches are interconnected. When a network wiring is incorrect or a switch is incorrectly configured, a loop also occurs in the large layer 2 network. Consequently, after a flooding packet sent by a switch arrives at another switch through the aggregation (or core) switch, the flooding packet is sent by the another switch back to the switch, causing a broadcast storm.

Currently, in a relatively common loop failure handling method, a switch sends a probe packet, and determines, by monitoring whether the probe packet is received by a same port for a plurality of times, whether a loop exists in a network. If the probe packet is received by a port of the switch for a plurality of times, the switch determines that the port is a faulty port and performs a loop protection action, that is, blocks the faulty port.

However, if a plurality of switches in the loop perform the loop protection action simultaneously (that is, each switch detecting the loop blocks a faulty port of the switch), a plurality of blocking points are formed in the ring network. This may cause an interruption of a normal service.

SUMMARY

Embodiments of the present disclosure provide a loop failure handling method to avoid a service interruption caused by loop protection actions that are simultaneously performed by a plurality of network devices when a loop occurs in a network.

A first aspect of the embodiments of the present disclosure provides a loop failure handling method. A switch receives a first packet, where the first packet includes a source media access control (MAC) address, and the source MAC address is a MAC address of a device that generates the first packet. The switch obtains a first flapping count corresponding to the source MAC address, where the first flapping count indicates a quantity of times that the source MAC address flaps between different ports of the switch. The switch determines, based on the first flapping count, whether a loop failure occurs in a network in which the switch is located. The switch obtains a flapping port set corresponding to the source MAC address when the loop failure occurs in the network in which the switch is located, where the flapping port set includes a plurality of ports of the switch to which the source MAC address flaps sequentially. The switch determines a primary port in the plurality of ports, and enables a flooding suppression function on the primary port, where the primary port is a port that must be suppressed and the flooding suppression function is used to suppress forwarding of a received flooding packet by the primary port. The suppressing forwarding of a received flooding packet by the primary port is enabling the primary port not to forward flooding packets received by the primary port or to forward only some flooding packets received by the primary port.

In the method in the first aspect of the present disclosure, when detecting a loop failure, the switch can determine a plurality of flapping ports of the switch, select at least one primary port from the plurality of flapping ports, and enable the flooding suppression function on each of the at least one primary port, so that each primary port does not forward the flooding packets received by the primary port or forwards only some flooding packets received by the primary port. In the present disclosure, only forwarding of a received flooding packet by the primary port of the switch is suppressed, and other types of packets are not suppressed. Therefore, a network service interruption caused by blocking all flapping ports in a conventional loop protection solution can be avoided.

That the switch enables a flooding suppression function on each primary port may be that the switch sends a first flooding suppression instruction to each primary port to enable the flooding suppression function, or may be that the switch directly enables the flooding suppression function on each primary port according to a switch configuration performed by a user.

In a first implementation of the first aspect, the primary port may be one or more ports. When there is a plurality of primary ports, the switch enables the flooding suppression function on each of the plurality of primary ports. This can avoid forming a broadcast storm in the network while avoiding a network service interruption, and reduce adverse impact of the loop failure on the whole network.

In a second implementation of the first aspect, the switch further determines a secondary port in the plurality of ports, where the secondary port is a port suppressed optionally. The switch enables the flooding suppression function on the secondary port. The secondary port is a port on which the switch learns the source MAC address earliest. In addition, when the network in which the switch is located is an Ethernet, the primary port may be an access-side port or a network-side port of the switch, and the secondary port may also be an access-side port or a network-side port of the switch. Certainly, the primary port and the secondary port are different ports of the switch. When the network in which the switch is located is a Transparent Interconnection of Lots of Links (TRILL) network or a Virtual eXtensible Local area network (VXLAN), both the primary port and the secondary port are access-side ports of the switch.

That the switch enables the flooding suppression function on the secondary port may be that the switch sends a second flooding suppression instruction to the secondary port to enable the flooding suppression function, or may be that the switch directly enables the flooding suppression function on the secondary port according to a switch configuration performed by the user.

Different from the conventional loop failure protection solution, the method provided by this embodiment of the present disclosure may be not only applied to the Ethernet, but also applied to the TRILL network or the VXLAN, to compensate for a disadvantage that the TRILL network or the VXLAN cannot avoid an access-side loop.

In a third implementation, the switch may further determine, based on actual usage of the network in which the switch is located, a type of flooding packet that needs to be suppressed, and add the determined type of flooding packet to the first flooding suppression instruction and/or the second flooding suppression instruction, so that each port receiving the first flooding suppression instruction and/or the second flooding suppression instruction suppresses a flooding packet properly, striking a balance between avoiding a broadcast storm and fully using a network forwarding capability. The type of flooding packet includes one or more of broadcast, unknown multicast, and unknown unicast.

In addition, the switch may further set a suppression ratio for each type of packet, and add the suppression ratio to the first flooding suppression instruction and/or the second flooding suppression instruction, to avoid a network service interruption caused by suppressing all flooding packets by the port receiving the first flooding suppression instruction and/or the second flooding suppression instruction.

In a fourth implementation of the first aspect, after determining that the loop failure is recovered, the switch sends an unsuppress instruction to each suppressed port, where the unsuppress instruction is used to trigger the port receiving the unsuppress instruction to forward the received flooding packet.

In the fourth implementation, the switch can automatically detect whether the loop failure is recovered, and unsuppress the suppressed port after the loop failure is recovered. This can accelerate recovery of the loop failure, and improve network utilization.

In a fifth implementation of the first aspect, when obtaining the first flapping count corresponding to the source MAC address, the switch searches a flapping information table based on the source MAC address to obtain a flapping information entry corresponding to the source MAC address, where the flapping information entry includes the flapping port set and the first flapping count. The switch obtains the first flapping count from the flapping information entry.

The fifth implementation provides a specific method for obtaining the first flapping count. Storing the flapping port set and the first flapping count in a same entry can shorten a search time and improve search efficiency.

In a sixth implementation of the first aspect, the first flapping count is a quantity of times that the source MAC address flaps between different ports of the switch, starting from a flapping start time. The switch may determine, based on the first flapping count, whether a loop failure occurs in the network in which the switch is located, in one of the following two manners. In a first manner, the switch compares the first flapping count with a preset flapping threshold, and when the first flapping count is greater than or equal to the flapping threshold, determines that the loop failure occurs in the network in which the switch is located; or in a second manner, the switch determines a first time difference between a current system time and the flapping start time, calculates a ratio of the first flapping count to the first time difference to obtain a first flapping frequency, compares the first flapping frequency with a preset flapping frequency threshold, and when the first flapping frequency is greater than or equal to the flapping frequency threshold, determines that the loop failure occurs in the network in which the switch is located.

The sixth implementation provides a specific method for determining a loop failure. Based on the flapping start time in the flapping information table provided in this embodiment of the present disclosure, the switch may determine, by using a plurality of methods, whether a loop failure occurs in the network in which the switch is located. This improves flexibility of detecting a loop failure.

In a seventh implementation of the first aspect, the flapping information entry further includes a last update time of a MAC entry corresponding to the source MAC address in a MAC address table of the switch. When determining that the loop failure is recovered, the switch calculates a second time difference between the current system time and the last update time of the MAC entry; and when the second time difference is greater than or equal to a specified duration, determines that the loop failure is recovered.

In the seventh implementation, the switch may automatically determine that the loop failure is recovered, and automatically send an unsuppress instruction to each suppressed port. This accelerates recovery of the network service.

In an eighth implementation of the first aspect, before searching the flapping information table based on the source MAC address, the switch determines a first port that receives the first packet. When the first port is different from a prior port corresponding to the source MAC address, the switch updates the flapping information table based on the first port, where the prior port is a port in the MAC entry corresponding to the source MAC address when the switch receives the first packet.

In a ninth implementation of the first aspect, the flapping information table includes the flapping information entry corresponding to the source MAC address, and the first port is already in the flapping port set; and when updating the flapping information table based on the first port, the switch changes the last update time in the flapping information entry to a time at which the switch updates the MAC entry based on the first port, and adds 1 to a prior flapping count in the flapping information entry to obtain the first flapping count, where the prior flapping count is a flapping count in the flapping information entry before the flapping information table is updated.

In a tenth implementation of the first aspect, the flapping information table includes the flapping information entry corresponding to the source MAC address, and the first port is not in the flapping port set; and when updating the flapping information table based on the first port, the switch adds the first port to the flapping port set sequentially, changes the last update time in the flapping information entry to a time at which the switch updates the MAC entry based on the first port, and adds 1 to a prior flapping count in the flapping information entry to obtain the first flapping count, where the prior flapping count is a flapping count in the flapping information entry before the flapping information table is updated.

In an eleventh implementation of the first aspect, the flapping information table does not include the flapping information entry corresponding to the source MAC address; and when updating the flapping information table based on the first port, the switch adds, to the flapping information table, the flapping information entry corresponding to the source MAC address, adds the prior port and the first port sequentially to the flapping port set in the flapping information entry, adds, to the flapping information entry, the flapping start time and the last update time of the MAC entry corresponding to the source MAC address, and sets a flapping count in the flapping information entry to 1, to obtain the first flapping count. The flapping start time is a time at which the switch determines that the first port is different from the prior port, and the last update time of the MAC entry is a time at which the switch updates the MAC entry based on the first port.

In the eighth to the eleventh implementations, the switch instantly records and updates the flapping information entry corresponding to the source MAC address in the flapping information table, and the update of the flapping information entry enables the switch to obtain latest information related to the MAC address. Therefore, accuracy and flexibility of operations of the switch based on the flapping information entry are improved.

The foregoing arrangement sequence of the implementations of the first aspect of the embodiments of the present disclosure is merely an example. When there is no logical conflict, each implementation of the first aspect, and a sequence of performing different steps in each implementation and a citation or reference relationship may be adjusted randomly according to a requirement without affecting the protection scope of the present disclosure.

A second aspect of the embodiments of the present disclosure provides a switch, where the switch includes a plurality of units that can implement the method in the first aspect and various implementations of the first aspect. For names of the plurality of units and a function performed by each unit, refer to claims.

A third aspect of the embodiments of the present disclosure provides a switch, where the switch includes a memory, a processor, and a plurality of ports. The memory is configured to store program code, and the processor is configured to invoke the program code to implement the method in the first aspect and various implementations of the first aspect.

A fourth aspect of the embodiments of the present disclosure provides a computer instruction, where when the computer instruction is invoked, the method in the first aspect and various implementations of the first aspect can be implemented.

A fifth aspect of the embodiments of the present disclosure provides a network system, where the network system includes a plurality of switches in the second aspect, or a plurality of switches in the third aspect.

BRIEF DESCRIPTION OF DRAWINGS

To describe the technical solutions in the embodiments of the present disclosure more clearly, the following briefly describes the accompanying drawings for describing the embodiments.

FIG. 6 is a schematic structural diagram of a flapping information table according to an embodiment of the present disclosure;

FIG. 7 is a schematic structural diagram of another flapping information table according to an embodiment of the present disclosure;

DESCRIPTION OF EMBODIMENTS

The following describes the technical solutions in the embodiments of the present disclosure with reference to the accompanying drawings in the embodiments of the present disclosure.

MAC address learning is a basic function of a switch, and is also a function that must be enabled when the switch runs. MAC address learning means that the switch obtains, after receiving a packet, a source MAC address of the packet and a port on which the switch receives the packet, and records a mapping relationship between the source MAC address and the port in a MAC address table. The learned mapping relationship may be used by the switch for packet forwarding. When the switch learns a same MAC address on different ports, the switch determines that a MAC address flapping corresponding to the MAC address exists, or the switch determines that the MAC address flaps between different ports of the switch. The switch also has a loop detection function. When detecting the MAC address flapping, and the MAC address flapping satisfies a preset condition, it may be determined that a loop exists in a network in which the switch is located.

Figure 1:
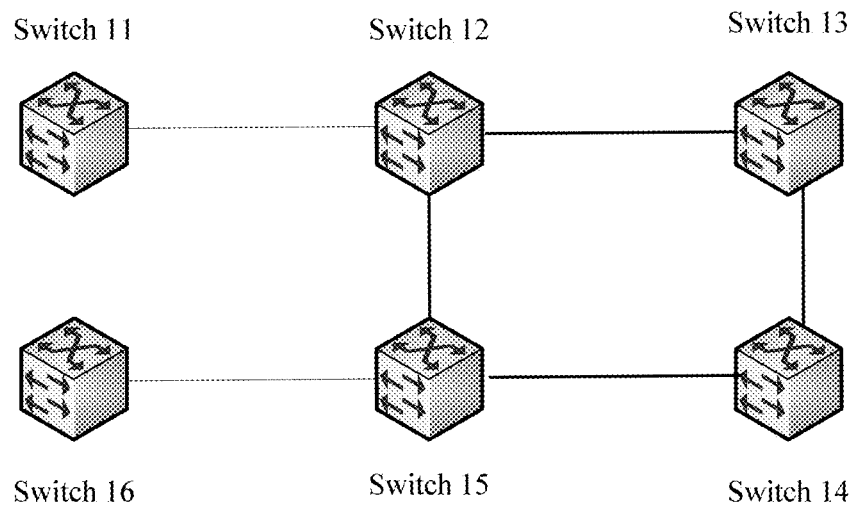
FIG. 1 is a schematic diagram of an Ethernet loop according to an embodiment of the present disclosure.

As shown in FIG. 1, FIG. 1 is a schematic diagram of an Ethernet loop according to an embodiment of the present disclosure. An Ethernet 100 includes a switch 11, a switch 12, a switch 13, a switch 14, and a switch 15. Due to an incorrect network wiring or an incorrect configuration of a network device, the switch 12, the switch 13, the switch 14, and the switch 15 form a loop (as shown by a thick solid line in FIG. 1), that is, a loop failure occurs in the Ethernet 100.

Figure 2:
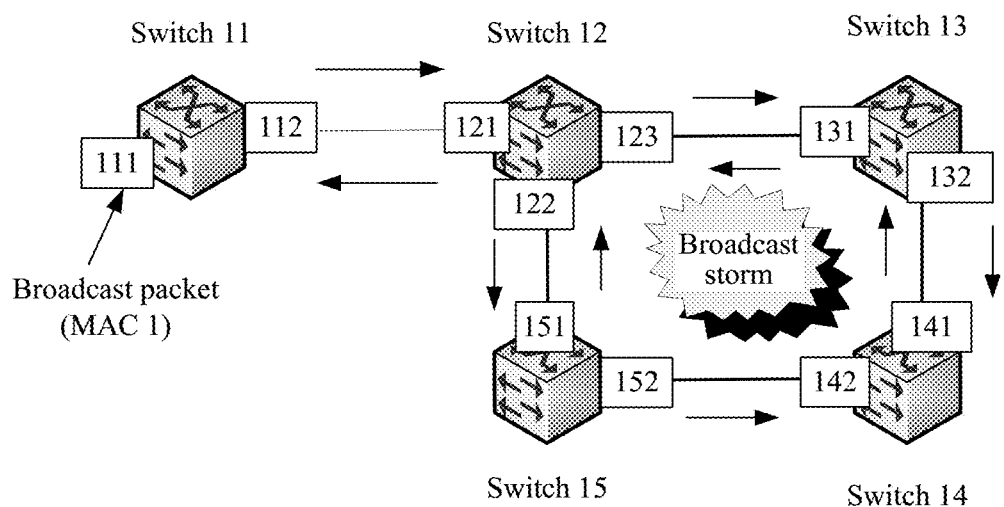
FIG. 2 is a schematic diagram of a broadcast storm caused by the loop in FIG. 1.

As shown in FIG. 2, after the switch 11 receives, by using a port 111, a flooding (flooding) packet whose source address is MAC 1, the switch 11 broadcasts the flooding packet through another port than the port 111. The flooding packet includes an unknown multicast packet (a multicast packet whose destination MAC address is not a broadcast address but the destination MAC address is not learned by the switch 11) and an unknown unicast packet (a unicast packet whose destination MAC address is not a broadcast address but the destination MAC address is not learned by the switch 11) in addition to a broadcast packet whose destination MAC address is a broadcast address, where the flooding packet is also referred to as a broadcast, unknown unicast and multicast (BUM) packet. The switch 12 continues to broadcast the flooding packet by using a port 122 and a port 123. The switch 13 and the switch 15 receive the flooding packet by using a port 131 and a port 151 respectively. Then the switch 13 and the switch 15 also separately broadcast the flooding packet. Finally, the flooding packet is broadcast continuously in a whole broadcast domain, and forms a broadcast storm.

Figure 3:
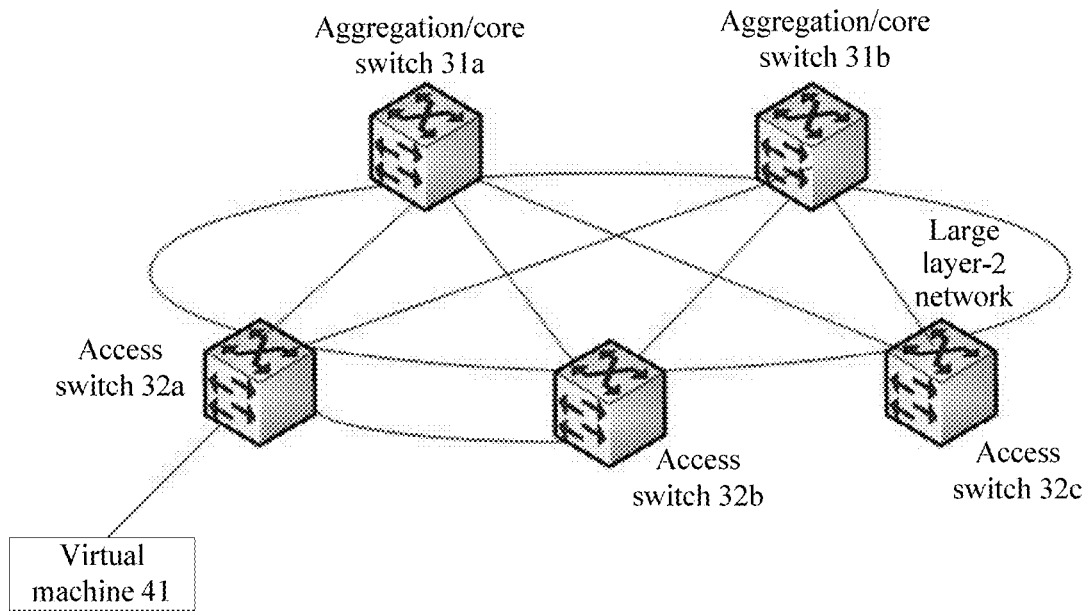
FIG. 3 is a schematic diagram of a data center network loop according to an embodiment of the present disclosure.

As shown in FIG. 3, FIG. 3 is a schematic diagram of a data center network loop according to an embodiment of the present disclosure. The data center network is a large layer 2 network. The large layer 2 network may be a TRILL network or a VXLAN. The large layer 2 network includes an access layer and a core layer. Because the large layer 2 network has only two layers, the core layer may also be referred to as an aggregation layer. The access layer includes access switches 32*a*, 32*b*, and 32*c*. The core layer includes core switches 31*a* and 31*b*. Each access switch is connected to both of the core switches. Either of the core switches is also connected to all of the access switches. However, there is no connection between the core switches 31*a* and 31*b*. Generally, no loop exists in the large layer 2 network, and there is no need to run a loop avoidance protocol either. However, when a network wiring is incorrect or a network configuration is incorrect, a loop also occurs in the large layer 2 network. FIG. 3 shows a loop caused by incorrect wiring in the large layer 2 network. The access switch 32*a*, the core switch 31*a*, and the access switch 32*b* form a loop. The access switch 32*a*, the core switch 31*b*, and the access switch 32*b* also form a loop. In addition, each access switch may further communicate with at least one virtual machine (VM). The figure shows a virtual machine 41 communicating with the access switch 32*a*. In a TRILL network, an access switch is a switch that enables a terminal device to access the TRILL network. In a VXLAN, an access switch may be referred to as a VXLAN tunnel endpoint (VTEP).

Figure 4:
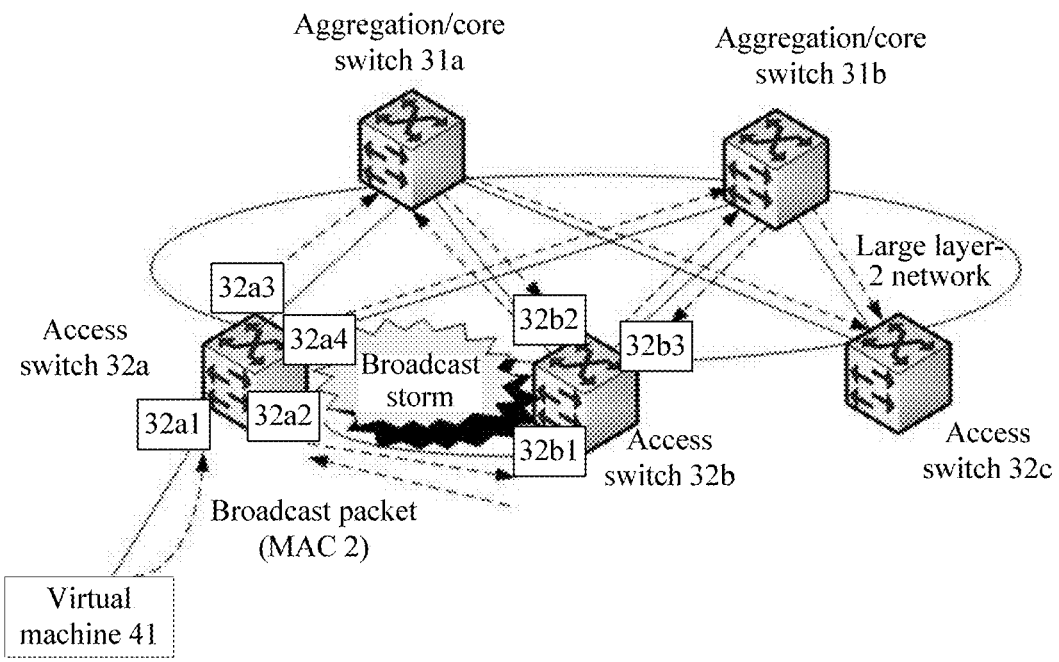
FIG. 4 is a schematic diagram of a broadcast storm caused by the loop in FIG. 3.

FIG. 4 is a schematic diagram of a process of generating a broadcast storm in a scenario in FIG. 3. As shown by a dashed line in FIG. 4, when the access switch 32*a* receives, by using an access-side port 32*a*1, a flooding packet that is sent by the virtual machine 41 and whose source MAC address is MAC 2, the switch 32*a* broadcasts the flooding packet through other ports than the port 32*a*1, that is, ports 32*a*2, 32*a*3, and 32*a*4. In this way, the flooding packet arrives at the core switch 31*a*, the access switch 32*b*, and the core switch 31*b* respectively. Each switch receiving the flooding packet sends the flooding packet in broadcast mode to other ports than the port receiving the flooding packet. For example, the core switch 31*a* and the core switch 31*b* respectively send the flooding packet in broadcast mode to the access switches 32*b* and 32*c*, and the access switches respectively send the flooding packet in broadcast mode to the core switch 31*a* and the core switch 31*b* by using a port 32*b*1 and a port 32*b*3. After receiving, the flooding packet sent by the access switch 32*b*, the core switch 31*a* sends the flooding packet in broadcast mode to the access switch 32*a* and the access switch 32*c* respectively. After receiving, from the access switch 32*b*, the flooding packet sent by the access switch 32*b*, the core switch 31*b* sends the flooding packet in broadcast mode to the access switch 32*a* and the access switch 32*c*. In this way, the access switch 32*a* receives the flooding packet sent by the access switch 32*a* itself, and continues to forwarding the packet. Therefore, a broadcast storm is formed.

Because a flooding packet can be transmitted only in a virtual local area network (VLAN), sending a flooding packet in all embodiments of the present disclosure means sending the flooding packet to a port that is configured with a same VLAN as the flooding packet.

Figure 5:
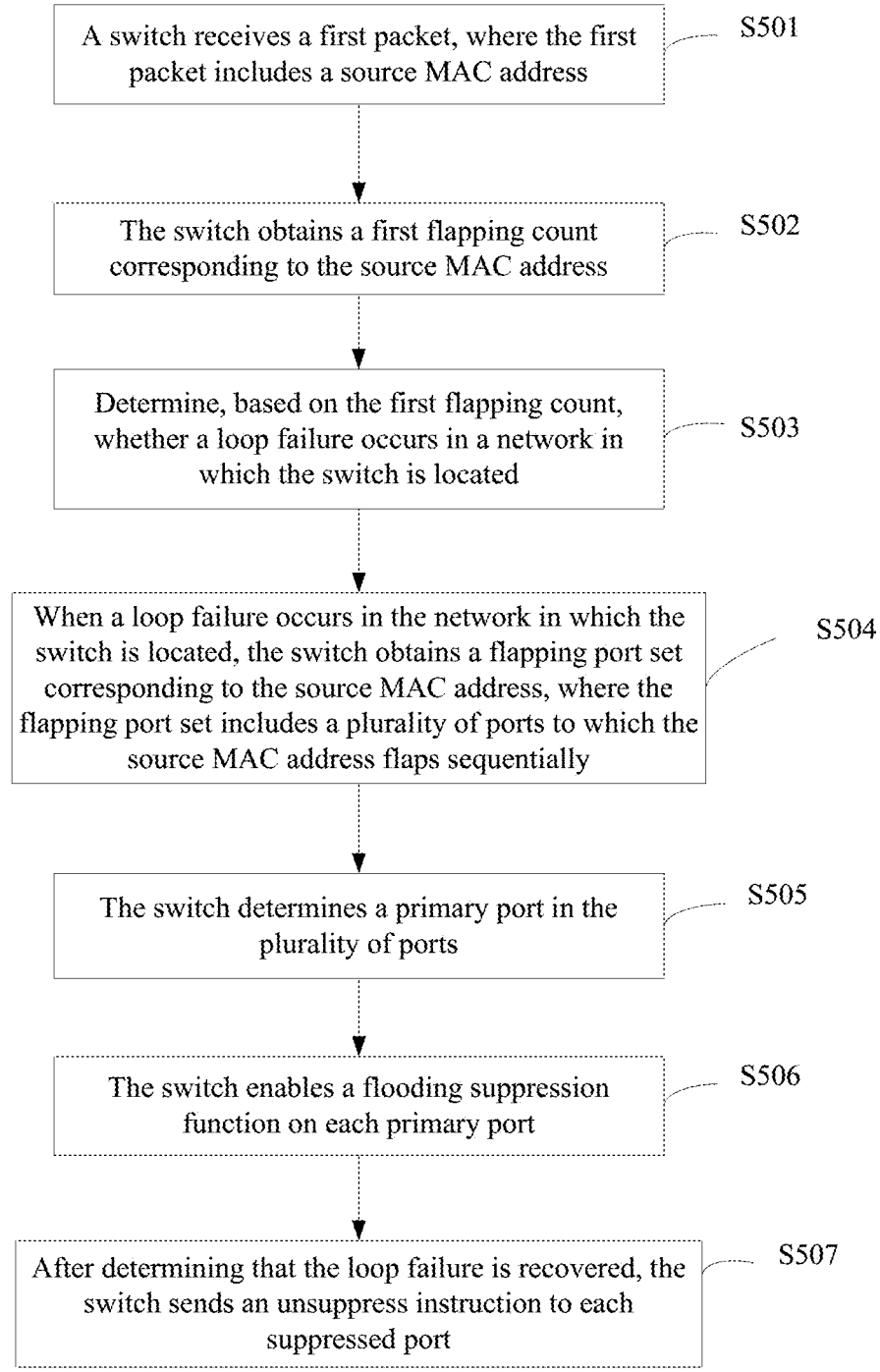
FIG. 5 is a schematic flowchart of a loop failure handling method according to an embodiment of the present disclosure.

To suppress the broadcast storm in FIG. 2 or FIG. 4, the present disclosure provides a loop failure handling method shown in FIG. 5. The method may be applied to each switch in FIG. 1 and FIG. 2, or applied to each access switch in FIG. 3 and FIG. 4. In S501, a switch receives a first packet, where the first packet includes a source MAC address.

The first packet is any packet received by the switch. The source MAC address is a MAC address of a device generating the first packet, for example, may be a MAC address MAC 2 of a virtual machine 41. The device generating the first packet is a physical terminal device or a virtual terminal device that needs to initiate a session, for example, a personal computer or a virtual machine. The first packet may be any one of an Ethernet frame, a TRILL-encapsulated packet, or a VXLAN-encapsulated packet. When the first packet is an Ethernet frame, the source MAC address is included in an Ethernet header of the Ethernet frame. When the first packet is a TRILL packet, the source MAC address is included in an inner packet header of the TRILL packet. When the first packet is a VXLAN packet, the source MAC address is included in an inner packet header of the VXLAN packet.

In S502, the switch obtains a first flapping count corresponding to the source MAC address.

The first flapping count indicates a quantity of times that the source MAC address flaps between different ports of the switch.

In an implementation, the switch maintains a flapping information table, and each entry of the flapping information table records flapping information of a MAC address. The flapping information of each MAC address includes a flapping port set corresponding to the MAC address and a quantity of times that the MAC address flaps on the switch. In addition, the flapping information of each MAC address may further include a flapping start time of the MAC address, and a last update time of a MAC entry corresponding to the MAC address in a MAC address table of the switch. FIG. 6 is a schematic diagram of a flapping information table on a switch 11. The flapping information in the flapping information table is merely an example. In another implementation, content of the flapping information may be further separately stored in different tables or different storage spaces. However, regardless of whether the content is separately stored in a plurality of tables or stored in a same table, finally the switch needs to recognize a correspondence between the source MAC address and the content. Information in the flapping information table is continuously updated with a MAC address learning process of the switch.

Therefore, S502 may include searching the flapping information table based on the source MAC address to obtain a flapping information entry corresponding to the source MAC address, and obtaining the first flapping count in the flapping information entry. The first flapping count is a quantity of times that the source MAC address flags between different ports of the switch, starting from the flapping start time.

In an implementation, the switch creates, only when determining that a prior port corresponding to a MAC address is different from a port of the MAC address currently learned, a flapping information entry corresponding to the MAC address. Therefore, before the searching the flapping information table based on the source MAC address to obtain a flapping information entry corresponding to the source MAC address, optionally, the method may further include the following steps.

A1. The switch determines a first port that receives the first packet.

A2. When the first port is different from a prior port corresponding to the source MAC address, the switch updates the flapping information table based on the first port. The prior port is a port in the MAC entry corresponding to the source MAC address when the switch receives the first packet. When the first port is inconsistent with the prior port, it indicates that the MAC address flaps. The switch updates the MAC address table and updates the flapping information table based on the first port. Updating the MAC address table means replacing the prior port in the MAC entry corresponding to the source MAC address in the MAC address table with the first port.

Updating the flapping information table includes three cases.

In a first case (marked with A2-1), the flapping information table includes the flapping information entry corresponding to the source MAC address, and the first port is already in a flapping port set corresponding to the source MAC address; and the updating the flapping information table based on the first port includes changing a last update time in the flapping information entry to a time at which the switch updates the MAC entry based on the first port; and adding 1 to a prior flapping count in the flapping information entry to obtain the first flapping count. The prior flapping count is a flapping count in the flapping information entry before the flapping information table is updated.

In a second case (marked with A2-2), the flapping information table includes the flapping information entry corresponding to the source MAC address, and the first port is not in a flapping port set corresponding to the source MAC address; and the updating the flapping information table based on the first port includes the switch adds the first port to the flapping port set sequentially, changes a last update time in the flapping information entry to a time at which the switch updates the MAC entry based on the first port, and adds 1 to a prior flapping count in the flapping information entry to obtain the first flapping count. The prior flapping count is a flapping count in the flapping information entry before the flapping information table is updated. Because the switch has generated the corresponding flapping information entry for the source MAC address, it can be known that, in this case, at least two flapping ports are included before the first port in the flapping port set.

In a third case (marked with A2-3), the flapping information table does not include the flapping information entry corresponding to the source MAC address; and the updating the flapping information table based on the first port includes the switch adds, to the flapping information table, the flapping information entry corresponding to the source MAC address, adds the prior port and the first port sequentially to a flapping port set in the flapping information entry, adds, to the flapping information entry, the flapping start time and a last update time of the MAC entry corresponding to the source MAC address, and sets a flapping count in the flapping information entry to 1, to obtain the first flapping count. The flapping start time is a time at which the switch receives the first packet. The last update time of the MAC entry is a time at which the switch updates the MAC entry based on the first port. The flapping information table does not include the flapping information entry corresponding to the source MAC address, because the switch detects the flapping of the source MAC address for the first time, or because a prior flapping information entry corresponding to the source MAC address is aged (deleted).

In another implementation, as long as the switch learns a MAC address, the switch adds a corresponding flapping information entry for the MAC address to the flapping information table. In this case, the initial flapping information entry includes only a port on which the switch receives a packet whose source MAC address is the MAC address and a time at which the MAC address table of the switch is updated based on the port, and other content in the entry is null or is 0. Afterward, the switch updates the flapping information table based on a flapping status of the MAC address in a manner same as the foregoing implementation.

In S503, the switch determines, based on the first flapping count, whether a loop failure occurs in a network in which the switch is located.

When no loop failure occurs in the network in which the switch is located, the switch forwards the first packet in a conventional manner. When a loop failure occurs in the network in which the switch is located, the switch performs S504.

In an implementation, the switch compares the first flapping count with a preset flapping threshold, and when the first flapping count is greater than or equal to the flapping threshold, determines that the loop failure occurs in the network in which the switch is located. Specifically, the switch may preset the flapping threshold and a detection period. When the first flapping count is greater than or equal to the flapping threshold in the detection period, the switch determines that the loop failure occurs in the network. For example, the detection period is five minutes, and the flapping threshold is 20. In a case shown in FIG. 6, if a flapping count corresponding to a MAC 1 is less than 20 within five minutes starting from T0, the switch considers that no loop failure occurs in the network. In a case shown in FIG. 7, when a flapping count corresponding to the MAC 1 is greater than 20 within five minutes starting from T1, the switch considers that a loop failure occurs in the network. In addition, the detection period is used to age the flapping information entry corresponding to the MAC address. For example, a flapping information entry corresponding to the MAC 1 is aged (that is, deleted) after five minutes starting from T0. In this way, a flapping count read by the switch every time is a flapping count in a detection period, and flapping counts are not accumulated across periods.

In another implementation, the switch may further determine, based on a preset flapping frequency threshold, whether a loop failure occurs. After determining the first flapping count corresponding to the source MAC address, the switch first calculates a first flapping frequency, where the first flapping frequency is determined by a ratio of a difference between a current system time and the flapping start time T0 to the first flapping count. When the flapping frequency is greater than or equal to the flapping frequency threshold, it is considered that a loop failure occurs in the network. For example, assuming that the flapping frequency threshold is 1 time/s, and the flapping start time T0 is 10:00:00 a.m., and the current system time is 10:00:20 a.m., and the read flapping count is 30 times shown in FIG. 7, the flapping frequency obtained through calculation is 30/20=1.5 times/s. Because 1.5 times/s is greater than 1 time/s, it may be determined that a loop failure occurs.

In S504, the switch obtains a flapping port set corresponding to the source MAC address, where the flapping port set includes a plurality of ports to which the source MAC address flaps sequentially.

In S505, the switch determines a primary port in the plurality of ports.

The plurality of ports belongs to the switch. The plurality of ports are arranged based on a time sequence in which the source MAC address flaps to the plurality of ports. The primary port is a port that must be suppressed. The plurality of ports further includes a secondary port, where the secondary port is a port suppressed optionally. It should be noted that, in the present disclosure, the primary port and the secondary port are used only for describing different operations on different ports. It is not required that physical division or classification-based storage should be performed on the plurality of ports in the flapping port set in an implementation of any embodiment of the present disclosure.

Using the switch 11 in FIG. 2 as an example, a flooding packet whose source MAC address is MAC 1 first arrives at the port 111 of the switch 11, and the switch 11 first records the port 111 in a flapping port set corresponding to the MAC 1. After the broadcast packet is sent out by using a port 112, because a loop exists, the switch 11 receives the broadcast packet again by using the port 112. In this case, the switch 11 learns the MAC 1 again on the port 112, and the switch adds the port 112 sequentially to the flapping port set corresponding to the MAC 1. Therefore, the flapping port set corresponding to the MAC 1 is {111, 112}, which includes the two ports 111 and 112 on which the MAC 1 is sequentially learned.

In the scenario shown in FIG. 2, the secondary port includes a port that is added by the switch to the flapping port set earliest; and the primary port includes one or more ports that are added after the primary port to the flapping port set by the switch. In this case, the port 111 of the switch 11 is a secondary port, and the port 112 is a primary port.

Similarly, flapping port sets of other switches in FIG. 2 are as follows:

switch 12: {121, 122, 123}, where the port 121 is a secondary port, and the ports 122 and 123 are primary ports;

switch 13: {131, 132}, where the port 131 is a secondary port, and the port 132 is a primary port;

switch 14: {141, 142}, where the port 141 is a secondary port, and the port 142 is a primary port; and switch 15: {151, 152}, where the port 151 is a secondary port, and the port 152 is a primary port.

In the scenario shown in FIG. 4, because the TRILL network and the VXLAN have eliminated a network-side loop in design principles, no additional processing is required on a network side. Therefore, when the flapping port set corresponding to the source MAC address is being determined, whether the port receiving the first packet is an access-side port or a network-side port needs to be further distinguished. On an access switch, a port used to connect to a virtual machine or another access switch is an access-side port, and a port used to connect to a core switch is a network-side port. In the scenario shown in FIG. 4, the secondary port includes an access-side port that is added by the switch to the flapping port set earliest; and the primary port includes one or more access-side ports (although a primary port of the switch 32b is not shown in FIG. 4 for brevity, the primary port necessarily exists in an actual network) that are added after the secondary port to the flapping port set by the switch.

In an implementation, description information may be added to the flapping port set to record an attribute of a port. In this case, flapping port sets of the access switches 32a and 32b may be:

access switch 32a: {32a1: access side, 32a2: access side, 32a3: network side, 32a4: network side}, where the port 32a1 is a secondary port, and the port 32a2 is a primary port; and access switch 32b: {32b1: access side, 32b2: network side, 32b3: network side}, where the access switch 32b has only a secondary port 32b1, and no primary port is shown.

In another implementation, information about a core switch may be added to the flapping port set to record an attribute of a port. For example, for the TRILL network, a nickname of a core switch may be used to replace a network-side interface, and in this case, flapping port sets of the access switches 32a and 32b may be:

access switch 32a: {32a1, 32a2, nickname31a, nickname31b}, where the port 32a1 is a secondary port, and the port 32a2 is a primary port; and access switch 32b: {32b1, nickname31a, nickname31b}, where only the secondary port 32b1 of the access switch 32b is shown, and no primary port is shown.

For another example, for the VXLAN, an Internet Protocol (IP) address of a core switch may be used to replace a network-side interface, and in this case, flapping port sets of the access switches 32a and 32b may be:

access switch 32a: {32a1, 32a2, IP31a, IP31b}, where the port 32a1 is a secondary port, and the port 32a2 is a primary port; and access switch 32b: {32b1, IP31a, IP31b}, where only the secondary port 32b1 of the access switch 32b is shown, and no primary port is shown.

In S506, the switch enables a flooding suppression function on each primary port, where the flooding suppression function is used to suppress forwarding of a received flooding packet by each primary port.

In addition to enabling the flooding suppression function on each flapping port among the primary ports, optionally, the flooding suppression function may be further enabled on the secondary port in this embodiment of the present disclosure, to suppress forwarding of a received flooding packet by the secondary port.

That the switch enables a flooding suppression function on each primary port may be that the switch sends a first flooding suppression instruction to each primary port to enable the flooding suppression function, or may be that the switch directly enables the flooding suppression function on each primary port according to a switch configuration performed by a user.

That the switch enables the flooding suppression function on the secondary port may be that the switch sends a second flooding suppression instruction to the secondary port to enable the flooding suppression function, or may be that the switch directly enables the flooding suppression function on the secondary port according to a switch configuration performed by the user.

Any flooding suppression instruction in this embodiment of the present disclosure is not used to suppress reception of a flooding packet by a port receiving the flooding suppression instruction.

In addition, each flooding suppression instruction may include a suppression parameter, where the suppression parameter may be a suppression rate or a suppression ratio. The suppression rate is used to indicate a rate at which the port receiving the flooding suppression instruction is allowed to send the flooding packet. The suppression ratio is used to indicate a ratio of to-be-suppressed flooding packets received by the port receiving the flooding suppression instruction. In an implementation, when the suppression parameter indicates complete suppression (which, for example, may be indicated by 1, 100, or 100%), the port receiving the flooding suppression instruction is forbidden to forward the received flooding packets. When the suppression parameter indicates partial suppression (which, for example, may be indicated by 0.95, 95, or 95%), the port receiving the flooding suppression instruction may forward the received flooding packets of a corresponding ratio. The suppression parameter in the first flooding suppression instruction may be the same or different from the suppression parameter in the second flooding suppression instruction.

In addition, either of the first flooding suppression instruction and the second flooding suppression instruction may further include a to-be-suppressed packet type, to indicate a packet that needs to be suppressed. For example, when the packet type included in the first flooding suppression instruction is a broadcast packet, the first flooding suppression instruction suppresses only a broadcast packet, and does not suppress an unknown unicast packet and an unknown multicast packet.

A sequence of enabling the flooding suppression function on each primary port and enabling the flooding suppression function on the secondary port by the switch is not limited in the present disclosure.

In this embodiment of the present disclosure, not all detected flapping ports are completely blocked when a loop failure occurs; instead, forwarding of received flooding packets needs to be completely forbidden or partially forbidden only on some or all flapping ports. This is different from other approaches. In each embodiment of the present disclosure, adverse impact of a loop failure on the whole network can be reduced, and a broadcast storm can be avoided. In addition, unicast traffic may continue to be forwarded, and no service interruption is caused in the network. In addition, even if detection is erroneous, great adverse impact on a service can also be avoided.

As shown in FIG. 7, the flapping information table may further include a suppression flag, used to indicate whether the switch has enabled the flooding suppression function on a port in the flapping port set corresponding to the source MAC address. For example, a suppression flag in FIG. 7 is 1, indicating that the switch has enabled the flooding suppression function on a port (according to system settings, the port may be a primary port or a primary port and a secondary port) in the flapping port set. If the suppression flag is 0, it indicates that the switch has not enabled the flooding suppression function on a port in the flapping port set. A person of ordinary skill may further set other suppression flags. For example, as long as the suppression flag is set, it is considered that the switch has sent a flooding suppression instruction.

After the switch enables the flooding suppression function, the method in this embodiment of the present disclosure optionally further includes S507.

S507. After determining that the loop failure is recovered, the switch sends an unsuppress instruction to each suppressed port, where the unsuppress instruction is used to trigger the port receiving the unsuppress instruction to forward the received flooding packet.

The suppressed flapping ports include at least each primary port, and may further include a secondary port.

In an implementation of the present disclosure, the determining that the loop failure is recovered may include, when the source MAC address does not flap after a specified duration, determining that the loop failure is eliminated. The switch may obtain a second time difference by subtracting the last update time of the MAC entry corresponding to the source MAC address in the flapping information table from the current system time, and compare the second time difference with the specified duration; and when the second time difference is greater than or equal to the specified duration, determine that the source MAC address does not flap after the specified duration, that is, determine that the loop failure is recovered. For example, assuming that the last update time of the MAC entry is 10:05:00 a.m., and the specified duration is five minutes, when the current system time is 10:10:01, the switch determines that the source MAC address does not flap for five minutes. Therefore, the switch considers that the loop failure is recovered, and sends an unsuppress instruction to the suppressed port in the flapping port set. After sending the unsuppress instruction, the switch deletes or migrates the flapping information entry corresponding to the source MAC address from the flapping information table to a history database.

In the foregoing manner, according to the solution in this embodiment of the present disclosure, the loop failure recovery can be detected automatically, and a loop protection action is released. This improves robustness of the network.

Figure 8:
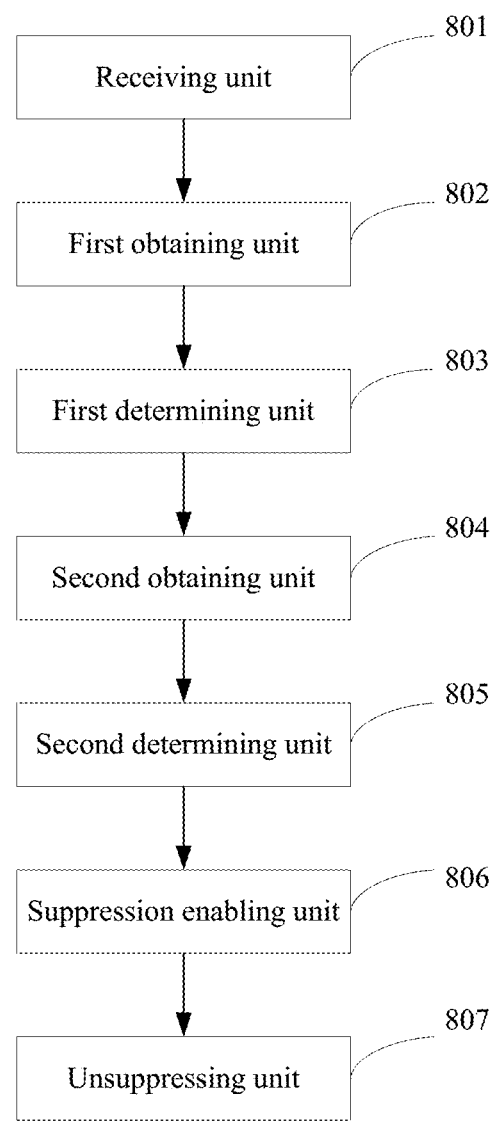
FIG. 8 is a schematic structural diagram of a switch according to an embodiment of the present disclosure.

To implement the method shown in FIG. 5, an embodiment of the present disclosure further provides a switch 800. FIG. 8 is a schematic structural diagram of the switch 800 according to an embodiment of the present disclosure. Corresponding to FIG. 5, the switch 800 includes a receiving unit 801, configured to perform S501 and various implementations of S501; a first obtaining unit 802, configured to perform S502 and various implementations of S502; a first determining unit 803, configured to perform S503 and various implementations of S503; a second obtaining unit 804, configured to perform S504 and various implementations of S504; a second determining unit 805, configured to perform S505 and various implementations of S505; a suppression enabling unit 806, configured to perform S506 and various implementations of S506; and an unsuppressing unit 807, configured to perform S507 and various implementations of S507.

The first obtaining unit 802 and the second obtaining unit 804 may be a same obtaining unit or may be different obtaining units. The first determining unit 803 and the second determining unit 805 may be a same determining unit or may be different determining units.

In addition, the switch 800 may further include a storage unit, configured to store the flapping information table. The switch 800 may further include an updating unit, configured to update the flapping information table when a MAC address flaps.

The foregoing division of units in FIG. 8 is an example, and is only intended for indicating that the switch shown in FIG. 8 can fully implement the method shown in FIG. 5. In an actual implementation, functional units in this embodiment of the present disclosure may be integrated into one processing unit, or each of the units may physically exist separately, or two or more units are integrated into one unit. For example, in the foregoing embodiment, the first obtaining unit 802 and the second obtaining unit 804 may be a same unit or may be different units. To be specific, division of units in the switch 800 may be in another manner. Each unit may be implemented in a form of hardware, or may be implemented in a form of a software functional unit.

Figure 9:
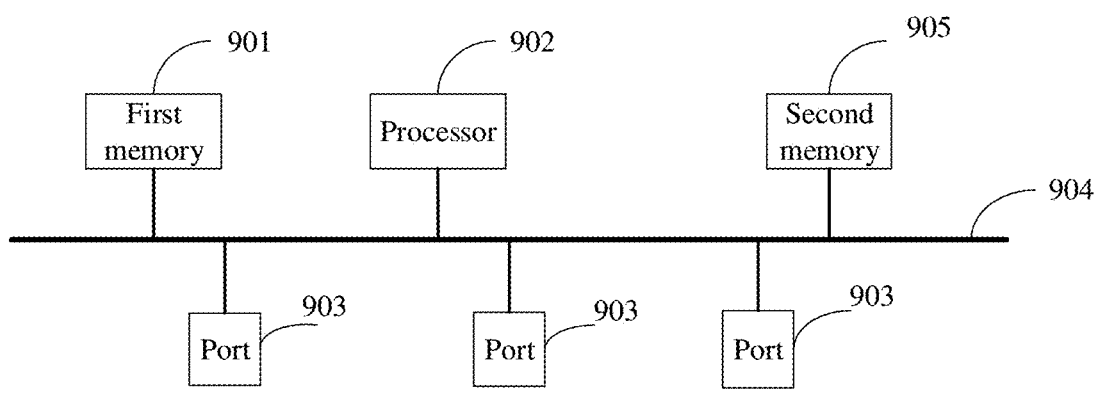
FIG. 9 is a schematic structural diagram of another switch according to an embodiment of the present disclosure.

To implement the method shown in FIG. 5, an embodiment of the present disclosure further provides another switch 900. FIG. 9 is a schematic structural diagram of the switch 900 according to an embodiment of the present disclosure.

Referring to FIG. 9, the switch includes a first memory 901, a processor 902, and a plurality of ports 903, where the first memory 901, the processor 902, and the plurality of ports 903 are interconnected by a bus 904. The bus 904 may be a peripheral component interconnect (PCI) bus or an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The first memory 901 is configured to store program code; the processor 902 is configured to invoke the program code to implement the method shown in FIG. 5 and the specific implementations of the method, and suppress a primary port and/or a secondary port in the plurality of ports, so that the primary port and/or the secondary port do/does not forward received flooding packets or forward/forwards received flooding packets according to a suppression ratio. The program code may be a computer program instruction. When the computer program instruction is invoked by the processor 902, the method shown in FIG. 5 and the specific implementations of the method can be implemented.

Each of the plurality of ports 903 is configured to receive or discard a packet under control of the processor 902 when the processor 902 invokes the program code.

The switch 900 may further include a second memory 905, and the second memory 905 is configured to store a flapping information table of the switch 900.

The first memory 901 and the second memory 905 may be a same memory or may be different memories.

The first memory 901 and the second memory 905 may be a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other form known in the art.

The processor 902 may be a central processing unit (CPU), an application-specific integrated circuit (ASIC), a digital signal processor (DSP), or one or more integrated circuits configured to implement the embodiments of the present disclosure.

The foregoing descriptions are merely examples of implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. A loop failure handling method, applied to a switch, wherein the method comprises:
  receiving a first packet comprising a source media access control (MAC) address, wherein the source MAC address is a MAC address of a device generating the first packet;
  obtaining a first flapping count corresponding to the source MAC address, wherein the first flapping count indicates a quantity of times that the source MAC address flaps between different ports of the switch;
  determining, based on the first flapping count, whether a loop failure occurs in a network in which the switch is located;
  obtaining a flapping port set corresponding to the source MAC address when the loop failure occurs in the network in which the switch is located, wherein the flapping port set comprises a plurality of ports of the switch to which the source MAC address flaps sequentially;
  determining a primary port in the plurality of ports, wherein the primary port is a port that must be suppressed; and
  enabling a flooding suppression function on the primary port, wherein the flooding suppression function suppresses forwarding of a received flooding packet by the primary port.

2. The method according to claim 1, further comprising:
  determining a secondary port in the plurality of ports, wherein the secondary port is a port suppressed optionally; and
  enabling the flooding suppression function on the secondary port,
  wherein the secondary port is an access-side port or a network-side port of the switch when the network in which the switch is located is an Ethernet network; and
  wherein the secondary port is an access-side port of the switch when the network in which the switch is located is a Transparent Interconnection of Lots of Links (TRILL) network or a Virtual eXtensible Local Area Network (VXLAN).

3. The method according to claim 1, wherein after determining that the loop failure is recovered, the method further comprises sending an unsuppress instruction to each suppressed port, wherein the unsuppress instruction triggers a port receiving the unsuppress instruction to forward a received flooding packet.

4. The method according to claim 1, wherein obtaining the first flapping count corresponding to the source MAC address comprises:
  searching a flapping information table based on the source MAC address to obtain a flapping information entry corresponding to the source MAC address, wherein the flapping information entry comprises the flapping port set and the first flapping count; and
  obtaining the first flapping count from the flapping information entry.

5. The method according to claim 4, wherein the flapping information entry further comprises a flapping start time corresponding to the source MAC address wherein the first flapping count is a quantity of times that the source MAC address flaps between different ports of the switch, starting from the flapping start time, and wherein determining, based on the first flapping count, whether the loop failure occurs in the network in which the switch is located comprises:
  comparing the first flapping count with a preset flapping threshold; and
  determining that the loop failure occurs in the network in which the switch is located, when the first flapping count is greater than or equal to the preset flapping threshold; or
  determining a first time difference between a current system time and the flapping start time;
  calculating a ratio of the first flapping count to the first time difference to obtain a first flapping frequency;
  comparing the first flapping frequency with a preset flapping frequency threshold; and
  determining that the loop failure occurs in the network in which the switch is located, when the first flapping frequency is greater than or equal to the preset flapping frequency threshold.

6. The method according to claim 4, wherein the flapping information entry further comprises a last update time of a MAC entry corresponding to the source MAC address in a MAC address table of the switch, and wherein determining that the loop failure is recovered comprises:

calculating a second time difference between a current system time and the last update time of the MAC entry; and determining that the loop failure is recovered, when the second time difference is greater than or equal to a specified duration.

7. The method according to claim 4, wherein before searching the flapping information table based on the source MAC address, the method further comprises:

determining a first port receiving the first packet; and updating the flapping information table based on the first port when the first port is different from a prior port corresponding to the source MAC address, wherein the prior port is a port in a MAC entry corresponding to the source MAC address when the switch receives the first packet.

8. The method according to claim 7, wherein the flapping information table comprises the flapping information entry corresponding to the source MAC address, wherein the first port is already in the flapping port set, and wherein updating the flapping information table based on the first port comprises:

changing a last update time in the flapping information entry to a time at which the switch updates the MAC entry based on the first port; and adding 1 to a prior flapping count in the flapping information entry to obtain the first flapping count, wherein the prior flapping count is a flapping count in the flapping information entry before the flapping information table is updated.

9. The method according to claim 7, wherein the flapping information table comprises the flapping information entry corresponding to the source MAC address, wherein the first port is not in the flapping port set, and wherein updating the flapping information table based on the first port comprises:

adding the first port to the flapping port set sequentially;

changing a last update time in the flapping information entry to a time at which the switch updates the MAC entry based on the first port; and adding 1 to a prior flapping count in the flapping information entry to obtain the first flapping count, wherein the prior flapping count is a flapping count in the flapping information entry before the flapping information table is updated.

10. The method according to claim 7, wherein the flapping information table does not comprise the flapping information entry corresponding to the source MAC address, and wherein updating the flapping information table based on the first port comprises:

adding, to the flapping information table, the flapping information entry corresponding to the source MAC address;

adding the prior port and the first port sequentially to the flapping port set in the flapping information entry;

adding, to the flapping information entry, the flapping start time and a last update time of the MAC entry corresponding to the source MAC address, wherein the flapping start time is a time at which the switch determines that the first port is different from the prior port, and wherein the last update time of the MAC entry is a time at which the switch updates the MAC entry based on the first port; and setting a flapping count in the flapping information entry to 1 in order to obtain the first flapping count.

11. The method according to claim 1, wherein when the network in which the switch is located is an Ethernet, the primary port is an access-side port or a network-side port of the switch, or wherein when the network in which the switch is located is a Transparent Interconnection of Lots of Links (TRILL) network or a Virtual eXtensible Local Area Network (VXLAN), the primary port is an access side port of the switch.

12. A switch, comprising:

a plurality of ports;

a first memory is configured to store program code; and a processor coupled to the first memory and the plurality of ports, wherein the processor is configured to invoke the program code to perform:

receiving a first packet comprising a source media access control (MAC) address, wherein the source MAC address is a MAC address of a device that generates the first packet;

obtaining a first flapping count corresponding to the source MAC address, wherein the first flapping count indicates a quantity of times that the source MAC address flaps between different ports of the switch;

determining, based on the first flapping count, whether a loop failure occurs in a network in which the switch is located;

obtaining a flapping port set corresponding to the source MAC address when the loop failure occurs in the network in which the switch is located, wherein the flapping port set comprises a plurality of ports of the switch to which the source MAC address flaps sequentially;

determining a primary port in the plurality of ports, wherein the primary port is a port that must be suppressed; and enabling a flooding suppression function on the primary port, wherein the flooding suppression function suppresses forwarding of a received flooding packet by the primary port.

13. The switch according to claim 12, wherein the processor is further configured to perform:

determining a secondary port in the plurality of ports, wherein the secondary port is a port suppressed optionally; and enabling the flooding suppression function on the secondary port, wherein the secondary port is an access-side port or a network-side port of the switch when the network in which the switch is located is an Ethernet network, or wherein the secondary port is an access-side port of the switch when the network in which the switch is located is a Transparent Interconnection of Lots of Links (TRILL) network or a Virtual eXtensible Local Area Network (VXLAN).

14. The switch according to claim 12, wherein the processor is further configured to perform, after determining that the loop failure is recovered, sending an unsuppress instruction to each suppressed port, wherein the unsuppress instruction triggers a port receiving the unsuppress instruction to forward a received flooding packet.

15. The switch according to claim 12, wherein obtaining the first flapping count corresponding to the source MAC address comprises:

searching a flapping information table based on the source MAC address to obtain a flapping information entry corresponding to the source MAC address, wherein the flapping information entry comprises the flapping port set and the first flapping count; and obtaining the first flapping count from the flapping information entry.

16. The switch according to claim 15, wherein the flapping information entry further comprises a flapping start time corresponding to the source MAC, wherein the first flapping count is a quantity of times that the source MAC address flags between different ports of the switch, starting from the flapping start time, and wherein determining, based on the first flapping count, whether the loop failure occurs in the network in which the switch is located comprises:

comparing the first flapping count with a preset flapping threshold; and determining that the loop failure occurs in the network in which the switch is located, when the first flapping count is greater than or equal to the preset flapping threshold; or determining a first time difference between a current system time and the flapping start time;

calculating a ratio of the first flapping count to the first time difference to obtain a first flapping frequency;

comparing the first flapping frequency with a preset flapping frequency threshold; and determining that the loop failure occurs in the network in which the switch is located.

17. The switch according to claim 15, wherein the flapping information entry further comprises a last update time of a MAC entry corresponding to the source MAC address in a MAC address table of the switch, and wherein determining that the loop failure is recovered comprises:

calculating a second time difference between a current system time and the last update time of the MAC entry; and determining that the loop failure is recovered, when the second time difference is greater than or equal to a specified duration.

18. The switch according to claim 15, wherein before searching the flapping information table based on the source MAC address, the processor is further configured to perform:

determining a first port receiving the first packet; and updating the flapping information table based on the first port when the first port is different from a prior port corresponding to the source MAC address, wherein the prior port is a port in a MAC entry corresponding to the source MAC address when the switch receives the first packet.

19. A network system comprising a plurality of switches, wherein each switch comprises:

a plurality of ports;

a first memory configured to store program code; and a processor coupled to the first memory and the plurality of ports, wherein the processor is configured to invoke the program code to perform:

receiving a first packet comprising a source media access control (MAC) address, wherein the source MAC address is a MAC address of a device that generates the first packet;

obtaining a first flapping count corresponding to the source MAC address, wherein the first flapping count indicates a quantity of times that the source MAC address flaps between different ports of the switch;

determining, based on the first flapping count, whether a loop failure occurs in a network in which the switch is located;

obtaining a flapping port set corresponding to the source MAC address when the loop failure occurs in the network in which the switch is located, wherein the flapping port set comprises a plurality of ports of the switch to which the source MAC address flaps sequentially;

determining a primary port in the plurality of ports, wherein the primary port is a port that must be suppressed; and enabling a flooding suppression function on the primary port, wherein the flooding suppression function suppresses forwarding of a received flooding packet by the primary port.

20. The network system according to claim 19, wherein the processor is further configured to perform:

determining a secondary port in the plurality of ports, wherein the secondary port is a port suppressed optionally; and enabling the flooding suppression function on the secondary port, wherein the secondary port is an access-side port or a network-side port of the switch when the network in which the switch is located is an Ethernet network, or wherein the secondary port is an access-side port of the switch when the network in which the switch is located is a Transparent Interconnection of Lots of Links (TRILL) network or a Virtual eXtensible Local Area Network (VXLAN).

* * * * *